US005620602A

United States Patent [19]
Stuth

[11] Patent Number: 5,620,602
[45] Date of Patent: Apr. 15, 1997

[54] METHOD AND APPARATUS FOR AEROBIC DIGESTION OF ORGANIC WASTE

[76] Inventor: Richard E. Stuth, 13232 - 138th Ave. SE., Renton, Wash. 98059

[21] Appl. No.: 561,519

[22] Filed: Nov. 22, 1995

[51] Int. Cl.$^6$ ................................. C02F 3/06
[52] U.S. Cl. .................... 210/608; 210/615; 210/151; 210/221.2; 210/532.2
[58] Field of Search .................... 210/608, 612, 210/615–617, 620, 150, 151, 188, 201, 202, 205, 207, 218, 221.2, 220, 532.2

[56] References Cited

U.S. PATENT DOCUMENTS

| | | | |
|---|---|---|---|
| 402,561 | 1/1977 | Traverse | 210/220 |
| 4,505,813 | 3/1985 | Graves | 210/221.2 |
| 5,194,144 | 3/1993 | Blough | 210/532.2 |
| 5,198,113 | 3/1993 | Daniels | 210/608 |
| 5,308,479 | 3/1994 | Iwa et al. | 210/151 |

Primary Examiner—Thomas G. Wyse
Attorney, Agent, or Firm—Christensen O'Connor Johnson & Kindness PLLC

[57] ABSTRACT

The invention provides a method and apparatus for increasing the rate of aerobic digestion of an organic waste. The apparatus is particularly suited for use with commercial or residential septic tanks. In general, the apparatus includes a medium with high surface area to volume ratio, a portion of which extends above the liquid level of waste in the tank. Aerated waste is frothed upward above the medium and cascades down over the exposed medium thereby enhancing aeration and subsequent reduction of biological oxygen demand concentrations. In certain embodiments the apparatus includes a surrounding clarifier to remove floating scum. The concentration of biological oxygen demand in the effluent from a septic tank may be reduced from about 230 mg/l to less than about 40 mg/l, and the total suspended solids concentration can be reduced from 75–150 mg/l to about 10 mg/l by using the apparatus and method of the invention.

22 Claims, 4 Drawing Sheets

METHOD AND APPARATUS FOR AEROBIC DIGESTION OF ORGANIC WASTE

FIELD OF THE INVENTION

The invention relates to the treatment of liquid organic waste to reduce the biological oxygen demand of the waste. More specifically, the invention provides a method and apparatus that enhances aeration of the waste, thereby increasing the rate of biological degradation of waste matter to measurably reduce biological oxygen demand and total suspended solids. Thus, the treatment system can either treat more waste, or waste of higher concentration, to a specified effluent biological oxygen demand or suspended solids concentration. The method and apparatus are particularly suited for use as a secondary treatment system of a residential or commercial septic tank, but are also more generally useful to treat liquid organic wastes.

BACKGROUND OF THE INVENTION

Conventionally, septic tanks have been used as a means for reducing the biological oxygen demand of waste water (sewage) from residences and commercial establishments when a conventional public sewer connection to a municipal treatment plant is not available. These septic tanks are conventionally buried underground and influent waste is reduced by an anaerobic digestion process. Typically, the tank is divided into two compartments so that primary anaerobic treatment takes place in the first compartment, and reduced waste flows into the second compartment. After further anaerobic reduction in the second compartment, the waste is discharged through an effluent pipe into a subsurface drainfield from which it percolates into the surrounding soil. Usually, state and local regulations govern the waste strength of the effluent at discharge to subsurface drainfields. Thus, tanks must be sized to meet these environmental regulations.

With increasing population density in regions that are not supplied with conventional sewer connections to a municipal treatment plant, increasing attention is being paid to the environmental and public health risks posed by septic tanks. It is expected that certain municipalities may in the future require more stringent standards for the release of effluent from septic tanks. These regulations are expected to control the concentration of waste strength released from the septic tank, and the concentration of waste strength at various locations within the plume of effluent percolating away from the tank into the subsoil. Advantageously, certain local governments allow a smaller drainage field if the septic tank effluent meets the standard of discharging a "sand filter quality effluent" to the drainage field. Thus, if the efficiency of septic tank waste reduction can be improved to meet this requirement,, home and business land owners could potentially save money by having smaller lots, where lot size is dictated by drainfield requirements. This also allows potentially higher density housing, a benefit to land developers.

Such regulations may set standards that are difficult or impossible to meet with already-installed septic tanks. As a result, the regulations may encourage the installation of conventional sewer systems and municipal waste treatment plants. This solution is expensive, requiting large capital outlays, and is not practical in those areas where housing density is insufficient to economically support a conventional system. Consequently, other means must be found for further reducing the BOD of effluents from residential and commercial septic tanks.

SUMMARY OF THE INVENTION

The invention provides an apparatus and method for increasing the rate of aerobic digestion of a liquid organic waste so that the waste strength as measured by biological oxygen demand (BOD) and total suspended solids (TSS) is more rapidly reduced.

The apparatus of the invention is designed to mount within a second compartment of a septic tank, or within a body of liquid organic waste. The apparatus includes a longitudinally extending housing that is mounted vertically so that a base portion of the housing is submerged in the waste. An opening in the base of the housing permits the waste to enter into the interior of the housing and rise to its liquid level. A central air pipe extends axially downward in the housing so that its lower end penetrates the base of the housing and is exposed to the body of waste. The air pipe is surrounded by a coaxially aligned waste frothing pipe. The lower end of the frothing pipe extends to around the lower end of the air pipe beneath the waste so that air supplied to the air pipe bubbles through orifices in the air pipe through the waste and froths waste upward in the annular space between the air pipe and the froth pipe. The annular space between the second (froth) pipe and the housing contains packing media with a high surface area to volume ratio. This media extends from near the base of the housing to a location that would extend above the liquid level of the waste, when the housing is mounted in the waste. This media provides supporting surfaces for growth of aerobic microbial organisms that reduce the BOD of the waste. Thus, waste carded upward in the frothing pipe is ejected from the upper end of the pipe to impact upon a splash plate that deflects the waste downward so that it cascades over that exposed portion of the media that extends above the liquid level of the waste body. The frothing and cascading action enhances aeration of the waste and increases the rate of digestion of the waste by organisms on the packing media, as measured by a more rapid decrease in measured BOD and TSS concentration. Treated waste exits from the housing through an outlet in the housing that is located at a height such that its lower edge is approximately flush with the liquid level of the waste.

The apparatus may optionally be supplied with a vented cover filled with activated carbon for absorbing malodorous gases so that these do not vent to the atmosphere, causing a potential nuisance. Alternatively, it may be remotely vented.

The apparatus, in certain embodiments, also includes a clarifier section for removing floating scum from an effluent. In general, the clarifier is formed by an outer housing that surrounds the longitudinally extending housing of the apparatus, and that is in fluid communication with the interior of the longitudinally extending housing. The space between the longitudinally extending housing and the outer housing is compartmentalized by a plurality of baffles so that each compartment of the clarifier is in fluid communication with a neighboring compartment. Since the baffles extend to a level below the level of the waste, when the apparatus is mounted in a septic tank, liquid flows from one compartment to the next. Scum floats on the waste surface and is retained by the baffles in the compartments for periodic removal.

The invention also provides a method of increasing the rate of aerobic digestion of a waste. The method includes discharging an aerobic gas to below the surface of a body of an organic waste and bubbling the gas upward through the body of waste. The upwardly bubbling gas carries waste upward, through frothing action, to above the surface of the body of waste. The waste then cascades downward towards the body of water under gravity while flowing over surfaces coated with aerobic microbial organisms that reduce the organic matter of the waste thereby decreasing the BOD and TSS of the waste. Consequently, the method both enhances aeration of the waste by bubbling gas through the waste and frothing the waste, and also enhances reduction of waste components by cascading the waste over nonsubmerged oxygen-exposed surfaces coated with aerobic microbial organisms.

In accordance with the invention, BOD and TSS concentration levels are significantly reduced. In Washington State, the limits for effluent BOD and TSS from residential septic tanks are set at 230 mg/l and 150 mg/l, respectively. The invention reduces BOD to from about 50 to about 95% below the BOD limit and TSS to from about 50 to about 80% below the limit. A suitably sized apparatus, with a recirculation ratio of about 15, or more, can reduce BOD to 10 mg/l and TSS to 10 mg/l. Effluent of this low waste concentration can be disposed of in salt water.

The apparatus and method of the invention provides an effluent that has a significantly reduced waste strength. Moreover, the invention may be retrofitted to existing residential and commercial septic tanks, thereby enabling operators to meet more stringent regulation that may be promulgated. Even in the absence of such regulation, the invention improves and preserves the environment to the extent that the concentration of BOD of effluent waste is reduced. Moreover, by providing a better quality (lower BOD and TSS concentration) effluent the invention requires a smaller drainfield, thereby allowing users to potentially have smaller lots, where lot size is dictated by drainfield requirements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides an apparatus, and method, for increasing the rate of aerobic digestion of an organic waste so that its concentrations of BOD and TSS are more rapidly reduced. A properly sized apparatus, with an appropriate recirculation ratio, can reduce the BOD and TSS concentrations of the treated effluent to about 10 mg/l each, thus qualifying as dischargeable into salt water. In a preferred embodiment, the method and apparatus of the invention are applied to commercial and residential septic tanks. In order to more fully appreciate the invention, the embodiment will be described in detail, with reference to exemplary FIGS. 1 and 2.

Figure 1:
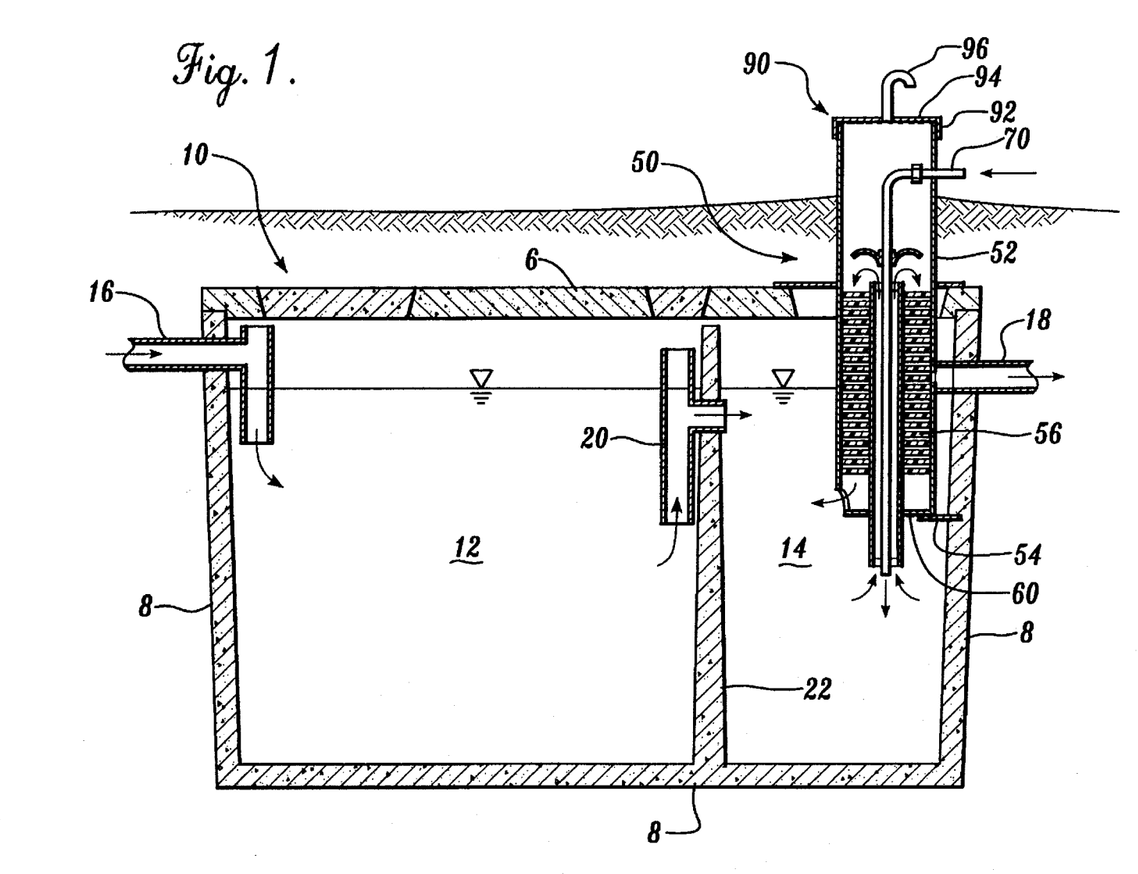
FIG. 1 is a schematic diagram of an apparatus according to the invention mounted in a secondary compartment of a septic tank.

Referring to FIG. 1, a subterranean septic tank 10 is divided into a primary compartment 12, and a secondary compartment 14, both surrounded by an outer wall 8 and topped with a roof 6. Liquid waste, containing initial measured BOD and TSS concentrations, enters the septic tank through inlet conduit 16, usually in the form of a T-shape, as illustrated. The waste rises to a predetermined liquid level that is controlled by the height of the outlet or effluent discharge pipe 18 that carries effluent from the septic tank 10 to the surrounding subsurface soil structure. However, flow of waste from the primary compartment 12 to the secondary compartment 14 is typically through an interconnecting T-shaped conduit 20. A horizontal leg of the T-shaped conduit extends through the wall 22 separating the primary and secondary compartments. Thus, the two compartments are in fluid communication. Waste entering the primary compartment is at least partially digested, mainly by anaerobic microorganisms, and then flows into the secondary compartment.

In accordance with the invention, the aerobic digester 50 is mounted in the secondary compartment 14. In the embodiment shown, the aerobic digester has a substantially cylindrical housing 52 that is vertically aligned and mounted within the secondary compartment 14 so that a proportion of the packing media 56, for supporting aerobic bacteria, that is disposed within the housing extends above the surface of the liquid level in the compartment. Treated waste outlet conduit 18 is in fluid communication with the interior of the housing 52, and drains aerated, treated waste through the surrounding wall of the septic tank 10, into the surrounding subsoil.

As can be seen more clearly in FIG. 2, the housing 52 has a base portion 58 that extends below the liquid level. The base of the housing is substantially covered with a base cover plate 60 with a central throughbore for accommodating a froth pipe 62. The base plate 60 is preferably attached to the froth pipe 62, in an embodiment, described below, wherein the apparatus is of modular construction. Moreover, to allow fluid communication between the liquid waste in the secondary compartment 14 and the interior of the housing 52, the housing has a waste recirculating orifice 64 near its base.

As shown, an air inlet tube 70 penetrates the cylindrical housing 50 at a location above the liquid level of the waste and extends downward along the central axis of the housing. A removable orifice tip 72 at the lower end of the air tube extends through the throughbore in the base plate 60 to a distance 11 below the base plate, into the waste. The frothing pipe 62 is coaxial with the air tube 70. The froth pipe extends from its top end 66, located at a height $1_2$ above the liquid level of the waste in the housing, to its lower end 68, located near the terminal end of the air tube 70. Preferably, both the air tube 70 and the surrounding froth pipe 62 are fabricated of polyvinyl chloride (PVC) and the concentric orientation of the air tube within the froth pipe is maintained by axially spaced-apart spacers 74. Thus, air (or any oxygen-containing gas able to support aerobic bacteria) entering through air pipe 70 bubbles from orifices 75 in the removable orifice tip 72 and enters into the lower end 68 of the froth pipe 62. Orifices 75 are located at a predetermined distance above the outlet of froth pipe 62 so that air bubbles must enter the annular space between the air tube 70 and the pipe 62. Frothed, aerated waste is carried up froth pipe 62 and exits from its upper end 66. A splash plate 78 surrounds air supply tube 70 at a location above the upper end 66 of the froth pipe so that froth exiting from the froth pipe impinges upon the splash plate and is deflected downward into the annular space between the froth pipe and the inner wall of the housing 52. As shown, splash plate 78 has a central throughbore that cooperates with the outer surface of air tube 70 and is mechanically, or frictionally held to the tube surface. Cup-shaped curved portions extend outwardly from the central throughbore to provide a shape adapted for intercepting upwardly moving froth and directing the froth downward into the annular space that is filled with packing media 56. The packing media, as will be explained below, is a medium suitable for supporting the growth of aerobic bacteria, and provides a high surface area to volume ratio. This packing media is stacked to a height L, of which a proportion $I_a$ is above the liquid level, while the remainder 11 is below the liquid level. To allow ready in and out flow of waste into the housing 52, the media extends to a distance $1_3$ from the base plate 60.

An outlet conduit 80 is in communication with the packed section of the housing and extends from the side of the housing 52. Conduit 80 is sized to cooperate with the treated effluent outlet 18 of the septic tank so that mechanical joining of the two effectively mounts the aerobic digester in the compartment. The outlet 80 is of such diameter, that a line of lowest elevation coincides with the liquid level of the waste in compartment 14. A spacer-ledge 54 extends rearward from near the base of the housing 52 to the wall of the septic tank to hold the tank in a vertical position.

Preferably, the apparatus is supplied with a cover 90. The illustrated embodiment of FIG. 1 of the cover includes a cylindrical body 92 supplied with a solid upper plate 94 with a throughbore through which extends a vent tube 96 for venting off gas to the atmosphere. In the alternate embodiment of FIG. 2, the cylindrical cover also has a gas-permeable base plate 98 so that a cylindrical volume is enclosed between the top plate 94, the cylindrical body 92, and the base plate. This volume is at least partially filled with activated carbon to remove malodorous off gases. A sleeve 100 surrounds the lower portion of the cylindrical cover 92 and is sized to fit tightly, in a virtually air-tight fit, over the upper end of cylindrical housing 52. Thus, the upper end of housing 52 is effectively sealed so that off gases must pass through the gas-permeable base plate 98, through the activated carbon, and thence into the atmosphere through the vent holes 102. The further alternate embodiment of FIG. 3 is like that of FIG. 2, but instead of vent holes, venting is through a vent tube 96.

In accordance with the invention, the structural components of the apparatus may be fabricated from PVC, a material that is resistant to corrosion by the liquid waste and off gases. It is also lightweight, relatively inexpensive, and provides ease of fabrication and installation.

Figure 3:
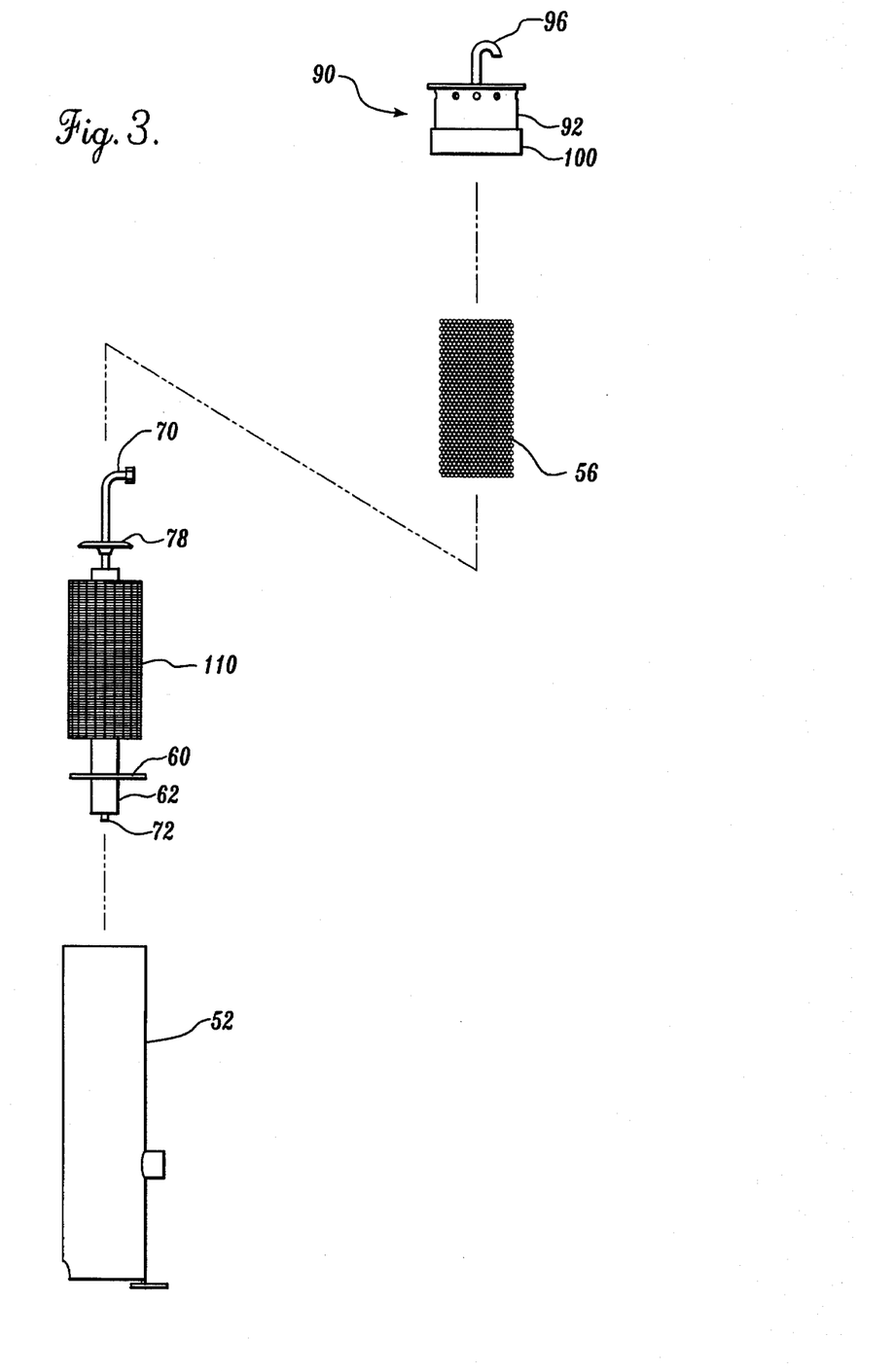
FIG. 3 is an exploded view of an embodiment of a modular insert for the apparatus of the invention.

In a preferred embodiment, shown in FIG. 3, the medium 56 is contained in a basket 110. The air tube 70, splash plate 78, froth pipe 62 with attached base plate 60, and air tube orifice tip 72 form a single module. This module may be inserted into a housing 52 with a diameter sized in accordance with the diameter of the basket 110. This type of modular construction allows ease of maintenance and repair. Thus, once a housing has been installed in place, the internal module can be easily removed, repaired or replaced, as needed.

In accordance with the method of the invention, waste flows from the primary compartment of the septic tank into the secondary compartment. The apparatus of the invention is mounted in the secondary compartment and fills with waste up to the liquid level. An oxygen-containing gas, such as air, is then blown under controlled pressure through the air tube into the waste, causing bubbling and frothing of the waste, while aerating the waste. Air and liquid waste enter the froth tube 62 and are carded upward as a froth in the froth tube. The frothed waste is expelled from the top of the froth tube and impinges on the splash plate. The deflected waste then falls, under gravity, downward onto the exposed-to-aerobic-gas media that extends above the liquid level to a height $1_a$. The waste cascades over this media, and is reduced by aerobic bacteria coating the media. Consequently, the concentrations of BOD and TSS in the waste are reduced. Upon reaching the waste liquid level, the waste commingles with liquid waste in the housing and a portion of the waste recirculates out of the housing through the opening 64 at its base. Another portion of the treated waste is diverted through outlet 80 into the septic tank outlet 18 as an effluent. Importantly, all waste must pass through the apparatus over the media, before exiting from the septic tank.

Figure 4A:
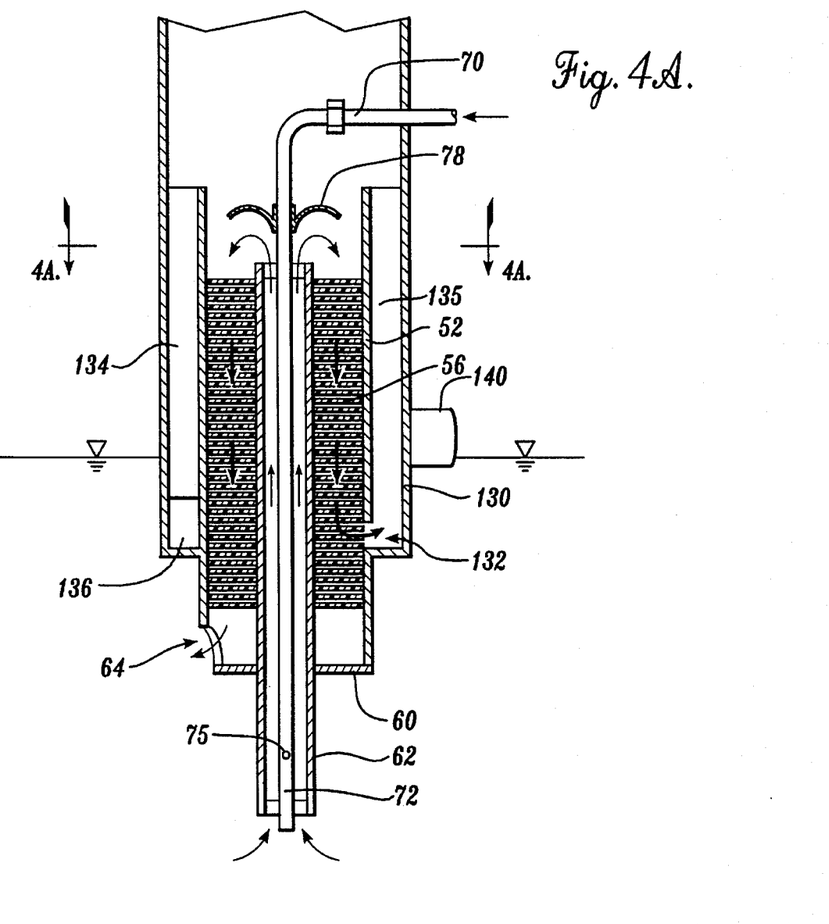
FIG. 4A is a schematic cross-sectional view of an embodiment of the invention including a surrounding clarifier.
Figure 4B:
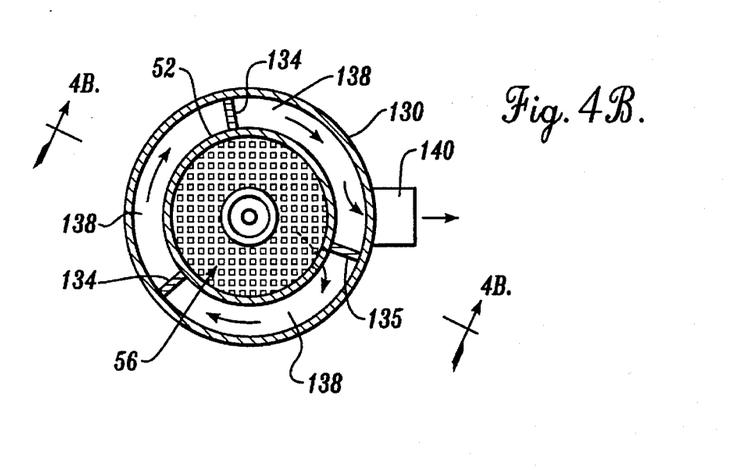
FIG. 4B is a cross-sectional top view of the embodiment of FIG. 4A taken along 4A—4A.

In a preferred embodiment, schematically shown in FIGS. 4A and 4B, the apparatus includes a clarifier to remove scum from the effluent. Thus, the cylindrical housing 52 is surrounded, at least partially, by a second concentric cylindrical outer housing portion 130, to form an annular space that is the clarifier section of the apparatus. Outer housing portion 130 need not extend the full length of housing 50 below the surface of the waste, but should extend to a depth in the waste so that the clarifier is able to perform the function of removing floating scum, as will be explained. Outer housing 130 is in fluid communication with the interior of internal housing 50 through an orifice 132 that allows treated waste to flow out of the treatment section of the inner housing into the annular space clarifier. The clarifier is supplied with a plurality of vertical baffles 134, each extending from a height above the liquid level of the waste in the apparatus to a level below the liquid level of the waste, thereby segregating the clarifier into separate compartments 138. A gap 136 in each baffle, at the base of each baffle, with the exception of the flow director baffle 135, allows fluid communication between compartments segregated by the baffles. The flow director baffle 135, located between the outlet 140 of the clarifier and the inlet orifice 132 is without a gap and directs flow clockwise around the clarifier. Treated liquid waste, including scum, flows into the annular space clarifier between housings 52 and 130 for scum separation. The liquid flow is directed clockwise by baffle 135, flows through gaps 136 near the base of each baffle 134 around the clarifier and finally exits through effluent outlet 140 to the drainage field. While flowing from one compartment to another, between the baffles 134, floating scum is retained in the clarifier compartments 138 by the baffles 134. Thus, only liquid waste, able to pass in the gaps underneath the baffles, reaches the outlet 140.

The above-described preferred embodiment permits the removal of scum and floating organic matter that is sloughed off the packing media in the aerobic digester enclosed by housing 52. As a result, the effluent has a lower concentration of biological organisms and other components of scum. The scum may be periodically removed by suction and recycled to the anaerobic digestion compartment 12 of the septic tank, or disposed of otherwise.

In operating the apparatus of the invention, it is preferred that a recirculation ratio of above 15 be maintained. The recirculation ratio is the ratio of the volume of waste cycled through the apparatus, divided by the total volume of waste exiting as effluent. Thus, for instance, if a septic tank treats 250 gallons per day, and the rate of flow of waste through the aerobic treatment apparatus is 6 gallons per minute (8,320 gallons per day), then the recycle ratio is 8320÷250=33.3.

The apparatus and method of the invention are capable of reducing the BOD of effluent from a septic tank from about 230 (the current regulatory maximum in Washington State) to less than about 40, preferably about 10. Thus, an increase in BOD reduction of at least about 85%, and in the range from about 50 to about 95%, is achievable with the invention. TSS concentration is likewise reduced from typical effluent levels in the range 75–150 mg/l to about 10 mg/l or less when the embodiment with a clarifier is used. Thus, the apparatus of the invention can reduce an effluent to have a BOD of about 10 and TSS of about 10, or less. Such effluents may be discharged directly into salt water.

The high surface area to volume ratio medium that is packed into the annular space may be selected from a variety of commercially available packing media. Preferably, the media are of a type that is resistant to corrosion in the liquid waste environment, lightweight, and has surface characteristics that allow aerobic bacteria to adhere and grow on its surfaces. Examples of such media include Jaeger Tri-Packs®, metal VSP®, metal Interpack®, plastic Tri-Packs®, plastic Nor-Pacs®, ceramic High Flow®, sold by Jaeger Products Inc. of Spring, Tex.; and IMPAC and LANPAC sold by Lantec Products, Inc., of Agoura Hills, Calif.; Burl Saddles, Pall Rings®; and the like. The surface area to volume ratio of these packing materials ranges from about 30 square feet per cubic foot to about 70 square feet per cubic foot, or more. Surface area:volume ratios in this range are regarded as "high," in accordance with the invention. However, in general, as the ratio increases, pressure drop through the packing also increases. Consequently, packing media are selected based on a high surface area:ratio, as well as pressure drop, and resistance to fouling considerations. Aside from these, fixed media may also be used. For example, a series of planar grids of plastic material may be stacked and attached at spaced intervals to the outside of the froth pipe. Such media also provide an adequate surface area: volume ratio, are lightweight, and inexpensive with low pressure drop.

As indicated above, a proportion of the total height of the packing medium extends above the liquid level of the waste in the housing. The proportion of exposed packing medium, $1_d/L$, is preferably in the range from about 30 to about 60%. More preferably, from about 40 to about 50% extends above the liquid level.

The following example illustrates an embodiment of the invention, described above and claimed herebelow, and does not limit the scope of the invention.

EXAMPLE

Figure 2:
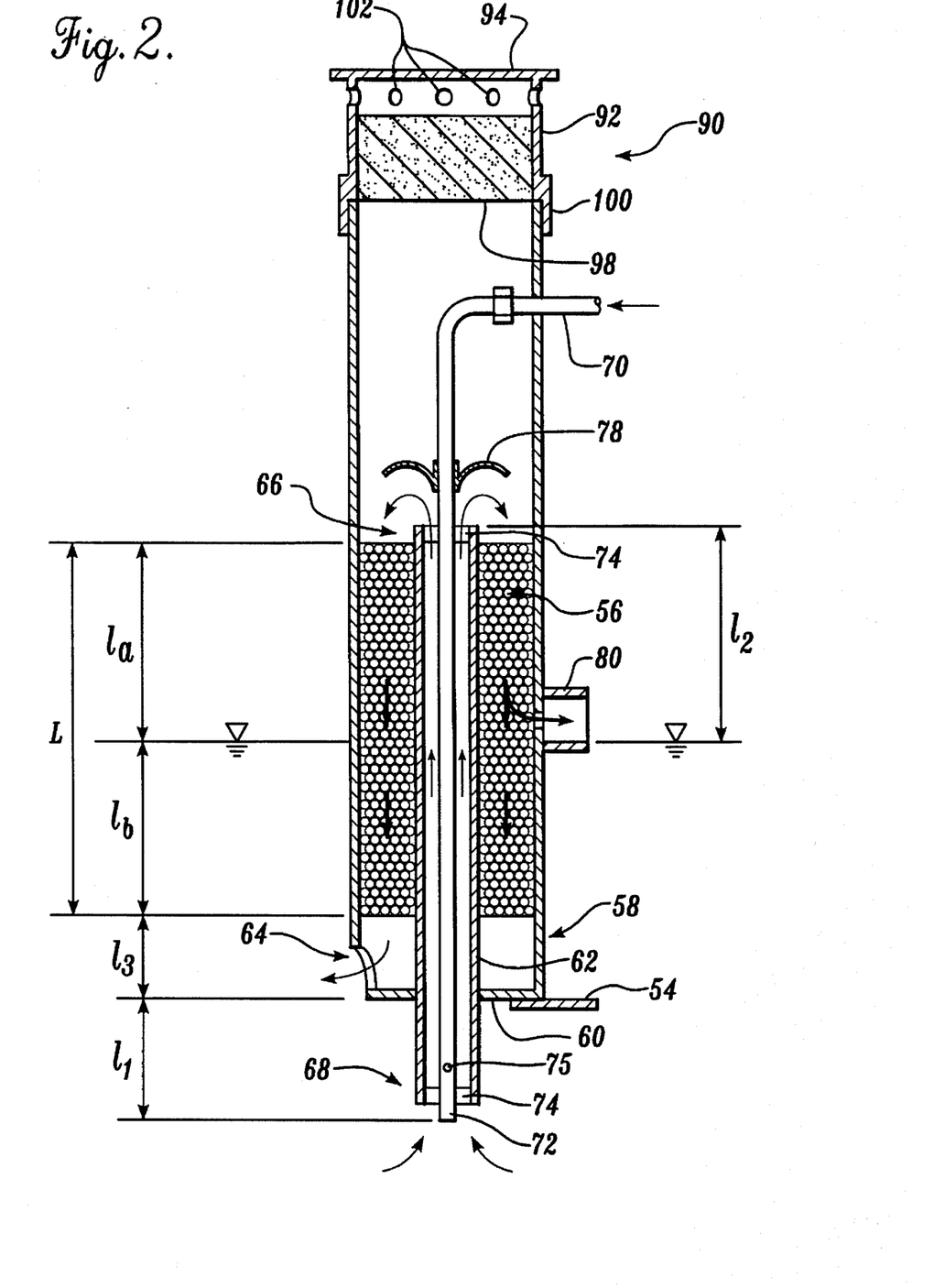
FIG. 2 is a schematic diagram of an embodiment of the apparatus of the invention.

Apparatus, substantially as illustrated in FIG. 2, were installed into the secondary compartment 14 of two residential septic tanks to test the efficacy of the invention. The approximate dimensions of the apparatus are as follows: The primary compartment of each tank had a volume of about 660 gallons and the secondary compartment a volume of 330 gallons. About 350 gallons of waste per day was treated in each septic tank. The housings 52 were 4 feet long, and 1 foot in diameter. The packing material was fixed, including horizontal spaced-apart plastic grids that were packed to a depth of 2.6 feet. Of this, 1.5 feet extended above the liquid level. Air was supplied at 4.0 cubic feet per minute. The surrounding froth pipe 62, was 3 inches in diameter and its upper end 66 extended about 1 inch above the medium. A splash plate 78 was located 6 inches above the upper end 66 of the froth plate. The housing were each supplied with a 4 inch diameter outlet conduit 80. Each housing was supplied with a cover 90 filled with activated carbon to remove malodorous off gases.

Before installation of the apparatus of the invention, one septic tank treated about 350 gallons per day of liquid waste to an effluent BOD concentration of about 230 mg/l. After installation of the apparatus of the invention, the effluent BOD of the same waste was reduced to less than 40 mg/l. Also, before installation of the apparatus, effluent TSS was at about 34 mg/l, and after installation this was reduced to as low as about 15 mg/l.

In the other tank, effluent BOD levels declined from about 230 mg/l before installing the apparatus of the invention, to as low as 18 using the apparatus of the invention. Also, effluent TSS declined from 24 mg/l before installing the apparatus of the invention, to about 18 mg/l after the apparatus was installed. Consequently, the apparatus and method of the invention resulted in about an 95 percent improvement in BOD reduction and about a 25% improvement in TSS reduction. It is expected that the embodiment of FIGS. 4A and 4B, including the clarifier, will further reduce TSS to less than 10 mg/l.

While the preferred embodiment of the invention has been illustrated and described, it will be appreciated that various changes can be made therein without departing from the spirit and scope of the invention.

The embodiment of the invention in which an exclusive property or priviledge is claimed are defined as follows:

1. A method of increasing the rate of aerobic digestion of an organic waste, the method comprising:
   (a) discharging an aerobic gas to below the surface of a body of organic waste;
   (b) bubbling the gas upward through the body of waste;
   (c) carrying waste upward above the liquid level of the body of waste, by frothing the waste with the gas; and
   (d) allowing the upwardly carded frothed waste to cascade downward over surfaces located above the liquid level of the waste, the surfaces coated with aerobic microbial organisms.

2. The method of claim 1, wherein the aerobic gas is air.

3. The method of claim 1, wherein a biological oxygen demand of the waste is reduced from about 250 to about 30.

4. The method of claim 1, wherein the waste is at a temperature of from about 5° to about 40° C.

5. The method of claim 1, wherein the allowing of the waste to cascade comprises allowing to cascade over a medium with a surface area to volume ratio of from about 30 to about 70 ft$^2$/ft$^3$.

6. The method of claim 1, wherein the waste is an organic residential liquid waste.

7. An apparatus for increasing the rate of digestion of an organic waste, the apparatus comprising:
   (a) a longitudinally extending housing, the housing adapted for mounting in a body of liquid organic waste such that at least a base portion thereof is submerged in the waste and the waste is in fluid communication with the interior of the housing;
   (b) a first pipe extending substantially along a central axis of the housing with a lower end extending to the vicinity of the base of the housing and an upper end adapted for connection to a supply of aerobic gas;
   (c) a second pipe having a first end and a second end, the second pipe coaxial with and surrounding a portion of the first pipe, the first end thereof located in the vicinity of the lower end of the first pipe such that gas exiting from the lower end of the first pipe into a liquid waste can be carried upward in the second pipe, the second end of the second pipe located at a height that would extend above the surface of the waste when the housing is mounted in the waste; and (d) media disposed in an annular space between the second pipe and an interior surface of the housing, the media extending from near the base of the housing up to a height that extends above the level of a liquid waste, when the housing is mounted in the waste.

8. The apparatus of claim 7, wherein the lower end of the first pipe penetrates the base of the housing and extends below the base.

9. The apparatus of claim 7, wherein an upper end of the second pipe that extends above the liquid level of the waste extends above the height of the media in the annular space when the housing is mounted in the waste.

10. The apparatus of claim 7, wherein the portion of the total height of the media that extends above the liquid level of the waste, when the housing is mounted in the waste, is from about 40 to about 50% of the total height of the media.

11. The apparatus of claim 7, wherein the media has a surface area to volume ratio of from about 30 to about 70 $ft^2/ft^3$.

12. The apparatus of claim 7, wherein the media is packed to a depth in the housing such that from about 40 to about 50 percent of the total depth of the media extends above the liquid level of the waste, when the housing is mounted in the waste.

13. The apparatus of claim 7, further comprising a splash plate mounted above the second end of the pipe, the plate shaped to deflect waste exiting upward from the second end of the second pipe downward onto the media in the housing.

14. The method of claim 7, wherein the media are enclosed in a basket, the basket having a base plate that is penetrated by the first and the second pipe.

15. The apparatus of claim 7, wherein the housing is substantially cylindrical.

16. The apparatus of claim 7, further comprising a cover, the cover mounted to an upper end of the housing to seal an opening of the housing, the cover comprising a vent for venting gas to the atmosphere.

17. The apparatus of claim 16, wherein the cover further comprises a gas-permeable base; a top cover spaced above the base; and activated carbon disposed between the gas-permeable base and the top cover for absorbing malodorous gases exiting from the housing.

18. An apparatus for increasing the rate of digestion of organic liquid waste, the apparatus comprising:

(a) a first cylindrical housing, the housing having an opening for inflow of liquid waste near a base portion thereof, the housing adapted for mounting vertically in a body of liquid organic waste such that at least the base portion thereof is submerged in the waste, and the waste is in fluid communication with an interior of the housing;

(b) a first pipe extending substantially along a central axis of the housing with a lower end of the pipe terminating in the vicinity of the base of the housing, and an upper end of the pipe extending outward of the housing and adapted for connection to a supply of aerobic gas;

(c) a second pipe having a first end and a second end, the second pipe coaxial with a vertical portion of the first pipe, the first end of the second pipe located in the vicinity of the lower end of the first pipe such that gas exiting from the lower end of the first pipe into a liquid waste is able to travel upward into the second pipe, the second end of the second pipe extending to a first height above the surface of the waste, when the housing is mounted in the waste;

(d) media disposed in an annular space between the second pipe and interior surfaces of the housing, the media extending from near the base of the housing up to about the first height; and (e) a splash plate mounted in the housing and spaced above the second end of the second pipe such that froth exiting upward from the second pipe is deflected by the splash plate onto the media.

19. The apparatus of claim 18, wherein from about 40 to about 50 percent of the height of the media extends above the liquid level of the waste, when the housing is mounted in the waste.

20. The apparatus of claim 18, further comprising a vented cover, the cover sealingly mounted to an upper end of the housing, the cover comprising a compartment filled with activated carbon for absorbing malodorous gases exiting from the housing.

21. The apparatus of claim 7, further comprising a second housing surrounding the longitudinally extending housing to form a clarifier space between the longitudinal housing and the second housing, the clarifier space in fluid communication with the interior of the longitudinal housing; and a plurality of longitudinal baffles dividing the clarifier space into compartments, each compartment in fluid communication with a neighboring compartment to direct flow of a liquid to an outlet from the clarifier space.

22. The apparatus of claim 18, further comprising a second outer concentric cylindrical housing surrounding the first cylindrical housing to form an annular space between the housings, the annular space in fluid communication with the interior of the cylindrical housing; and a plurality of longitudinal baffles dividing the annular space into compartments, each compartment in fluid communication with a neighboring compartment to direct liquid from an inlet compartment to an outlet from the annular space.

* * * * *

UNITED STATES PATENT AND TRADEMARK OFFICE
CERTIFICATE OF CORRECTION

PATENT NO. : 5,620,602
DATED : April 15, 1997
INVENTOR(S) : R.E. Stuth

It is certified that error appears in the above-indentified patent and that said Letters Patent is hereby corrected as shown below:

| COLUMN | LINE | |
|---|---|---|
| Title Page, Item | | |
| [56] | Refs. Cited (U.S. Pat. Docs.) | Insert the following reference: --5,030,353  7/1991  Stuth  210/615-- |
| [56] | Refs. Cited (U.S. Pat. Docs., Item 1) | "402,561" should read --4,002,561-- |
| [56] | Refs. Cited (U.S. Pat. Docs., Item 5) | "Iwa et al." should read --Iwai et al.-- |
| [56] | Refs. Cited (Other Publs.) | Insert the following references: --Lantec Products Inc., Brochure, date unknown. Jaeger Products, Inc., General Catalog 100, 1987.-- |
| 8 | 27 | "embodiment" should read --embodiments-- |

UNITED STATES PATENT AND TRADEMARK OFFICE
CERTIFICATE OF CORRECTION

PATENT NO. : 5,620,602
DATED : April 15, 1997
INVENTOR(S) : R.E. Stuth

It is certified that error appears in the above-indentified patent and that said Letters Patent is hereby corrected as shown below:

| COLUMN | LINE | |
|---|---|---|
| 8 | 28 | "priviledge" should read --privilege-- |
| 8 (Claim 1, | 37 line 8) | "carded" should read --carried-- |

Signed and Sealed this

Eighth Day of July, 1997

Attest:

BRUCE LEHMAN

Attesting Officer    Commissioner of Patents and Trademarks